United States Patent [19]
Yamanaka et al.

[11] 3,975,760
[45] Aug. 17, 1976

[54] SOLID STATE CAMERA
[75] Inventors: Seisuke Yamanaka, Mitaka; Yasuo Kanou, Tokyo; Tadayoshi Mifune, Yokohama; Satoshi Shimada, Tokyo, all of Japan
[73] Assignee: Sony Corporation, Tokyo, Japan
[22] Filed: Mar. 25, 1975
[21] Appl. No.: 561,945

[30] Foreign Application Priority Data
Mar. 29, 1974  Japan.............................. 49-35277

[52] U.S. Cl.................................... 358/41; 357/24
[51] Int. Cl.².......................................... H04N 9/04
[58] Field of Search ................ 358/41, 50; 178/7.1; 357/24; 307/221

[56]   References Cited
UNITED STATES PATENTS

| | | | |
|---|---|---|---|
| 3,777,061 | 12/1973 | Takemura............................ | 178/7.1 |
| 3,801,884 | 4/1974 | Sequin .................................. | 357/24 |
| 3,826,926 | 7/1974 | White et al. ......................... | 357/24 |
| 3,876,989 | 4/1975 | Bankowski et al................... | 357/24 |

*Primary Examiner*—Robert L. Griffin
*Assistant Examiner*—R. John Godfrey
*Attorney, Agent, or Firm*—Hill, Gross, Simpson, Van Santen, Steadman, Chiara & Simpson

[57]   ABSTRACT

A solid-state video camera employing a plurality of image sensing means in the form of charge coupled device chips which are arranged in such a manner that the video image cast on respective chips are displaced by distance equal to $\tau H/N$ where $\tau_H$ is the reciprocal of the image sampling frequency, also referred to as the alignment pitch of the picture elements in the horizontal direction and N is the number of charge coupled chips. After converting the images into electrical signals, read-out timings of given picture elements of respective chips are shifted in time in accordance with the shift in distance between the images on the respective chips prior to mixing the output signals. In this way a video output signal having a wide-band width is obtained. In addition, color video information is possible by the use of color filters which may be disposed in front of the respective charge coupled chips.

12 Claims, 11 Drawing Figures

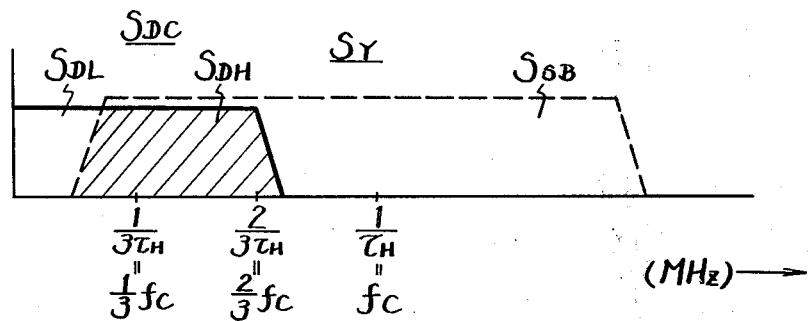
Fig. 4
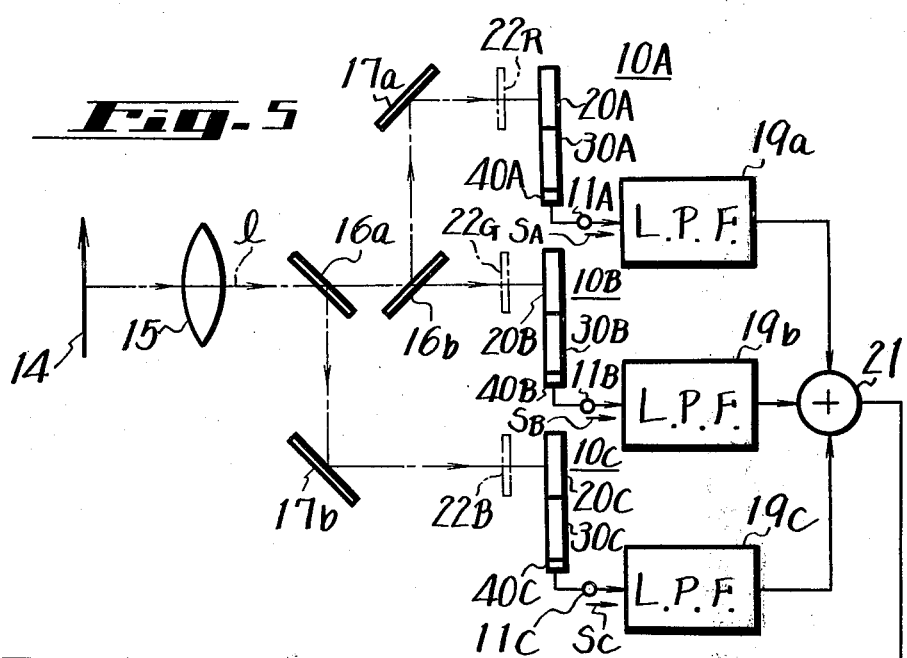
Fig. 5
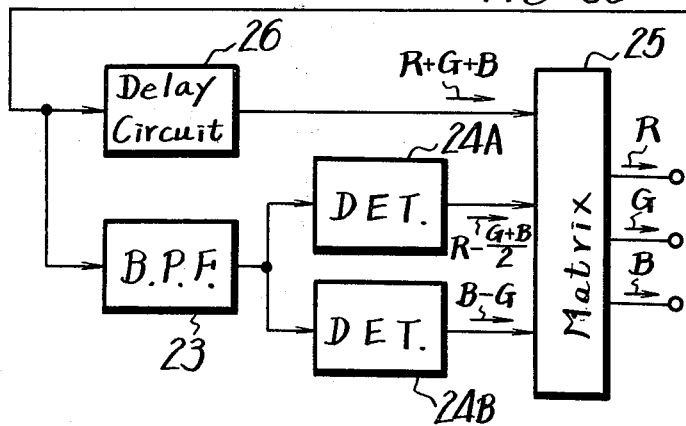

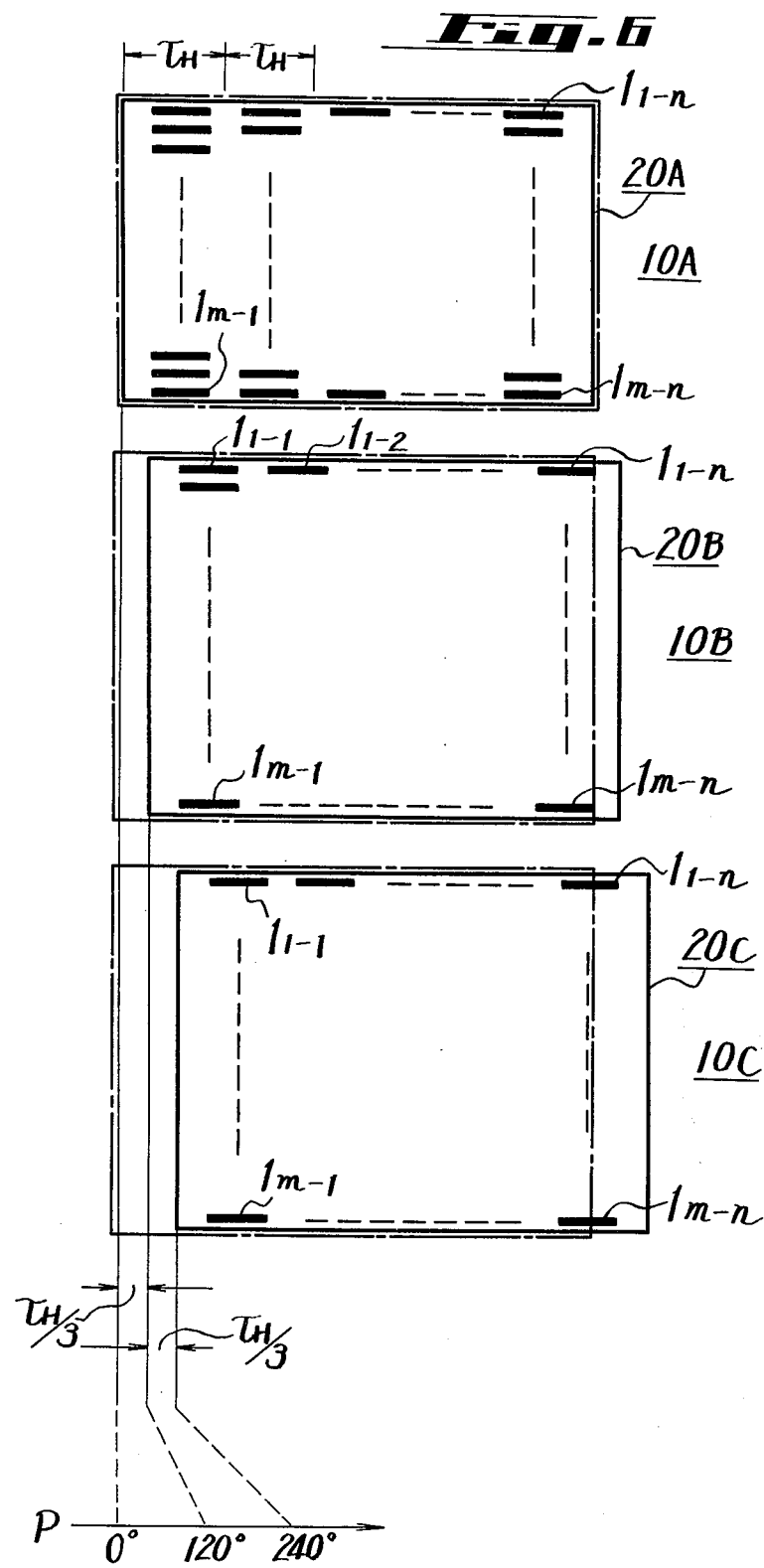

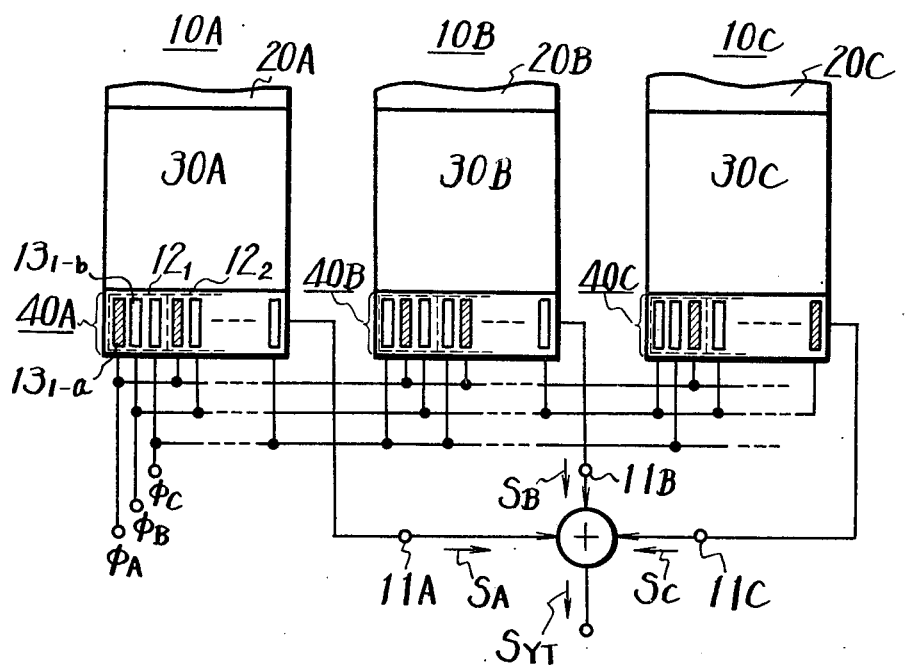
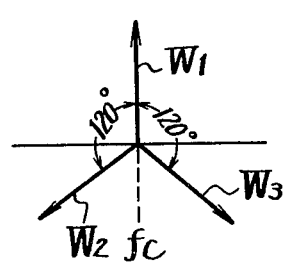
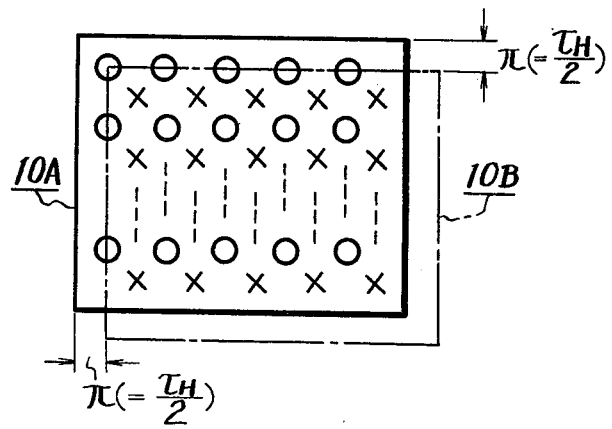

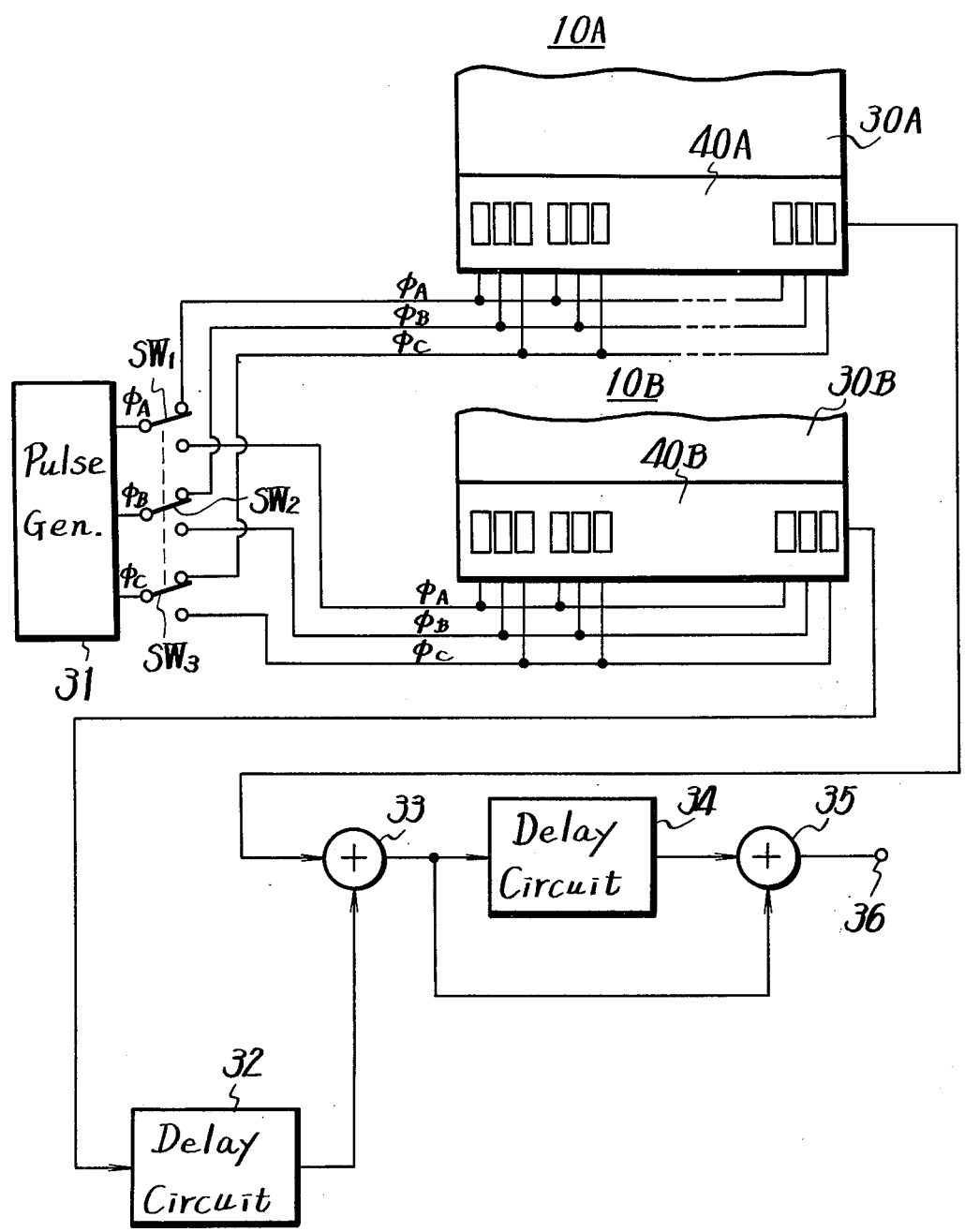

SOLID STATE CAMERA

BACKGROUND OF THE INVENTION

1. Field of the Invention

The field of art to which this invention relates is solid-state cameras and in particular to solid-state cameras using a pluraity of semiconductor image sensor chips.

2. Description of the Prior Art

In the case of using a solid state sensor such as a charge coupled device (hereinafter referred to as a CCD) as an image pickup device for a television camera, input photo or optical information corresponding to the image of an object are converted to electrical signals in response to sampling at every picture element. So in contrast to well known vidicons, output signals are sampled in an CCD at every picture element. If it is assumed that the sampling frequency is $f_c$, the alignment pitch $\tau_H$ in the horizontal direction is $1/f_c$. The electric charges stored in the respective picture elements are finally transferred to a output terminal at a rate determined by a clock pulse frequency and the video information is derived in serial form. The resultant video signal $S_Y$ contains DC components, $S_{DC}$ and side band components $S_{SB}$ of the sampling frequency $f_c$ modulated with the DC components $S_{DC}$.

The side band component $S_{SB}$ is distributed upper and lower with respect to the sampling frequency $f_c$ which is at its center. If the frequency band of the DC component $S_{DC}$ is selected sufficiently wide so as to increase the resolution, a higher band component $S_{DH}$ of the DC component is superimposed with the side band component and hence a certain part thereof is caused to develop a sampling error. This sampling error is shown in FIG. 4 as the cross hatched section. If a picture is reproduced from such a video signal, flicker is caused in the resulting picture.

Since this flicker is caused by the sampling error, the sampling error and consequently the flicker can be avoided by restricting the frequency band of the DC component $S_{DC}$ to be smaller than one-half of the sampling frequency $f_c$. However, if the frequency band of the DC component is restricted as above, the resolution is deteriorated. In order to make the frequency band of the DC component about 3.5 MHz without deteriorating the resolution, the sampling frequency $f_c$ may be made high enough. The sampling frequency $f_c$ is obtained by the product of $n f_H$ ($f_c = n f_H$) where n is the number of picture elements in the horizontal direction of the CCD and $f_H$ is the horizontal frequency of the television signal (practically, an effective scanning time period in the horizontal direction). If the sampling frequency $f_c$ is made so high as to remove the sampling error, the number n of the picture elements must be increased correspondingly, which then results in difficulty in the manufacturing of the CCD.

SUMMARY OF THE INVENTION

It is an important feature of the present invention to provide a solid state camera having a plurality of image-sensing means each of which in turn has a plurality picture elements which are aligned in at least one direction with a given alignment pitch $\tau_H$. Means are provided for casting images of an object simultaneously on each of the image-sensing means wherein the positions of the images are displaced by a distance $\tau_H/N$ where N is the number of image-sensing means in the camera.

It is a further feature of the invention to provide a solid state camera as described above where means are provided for shifting the readout times of the images by $2 \pi/N$ with regard to the frequency of occurrence of the picture elements in a given direction.

It is also an object of the present invention to provide a solid state camera as described above wherein means are provided for mixing the respective signal outputs and for deriving an output video signal from the mixing means.

It is a principal object of the present invention to provide a novel and effective solid state camera having a plurality simultaneously employable image sensing means.

It is another object of the invention to provide a solid state camera in which n's number of CCDs ($N \geq 2$) are used, the image of an object is cast on the respective CCDs under the condition that the CCDs are shifted by $\tau H/N$, and upon reading out signals from the CCDs, signals are alternately derived from the respective CCDs with the phase of $2 \pi/N$ to positively avoid the occurrence of any overlapping error and to improve the resolution in the horizontal direction without increasing the number of picture elements aligned in the horizontal direction, where $\tau_H$ represents the alignment pitch of image sensors used in the horizontal direction.

These and other features and advantages of the present invention will be understood in greater detail from the following description and the associated drawings wherein reference numerals are utilized to designate preferred embodiment.

BRIEF DESCRIPTION OF THE DRAWINGS

FIG. 4 is a frequency spectrum diagram of the output signal derived from the solid state image sensors shown in FIG. 1;

FIG. 5 is a schematic diagram showing an example of the color image pickup camera according to the invention;

FIG. 6 is a diagram showing the relative arrangement of the image of an object and the solid state image sensors of the camera shown in FIG. 5;

FIG. 7 is a diagram showing parts for deriving signals from the solid state image sensors shown in FIG. 5;

FIG. 8 is a vector diagram showing the phase of a sampling carrier for the respective solid state image sensors shown in FIG. 5;

FIG. 9 is a view showing the relative arrangement of the image of an object and solid state image sensors of another example of the invention; and FIG. 10 is a diagram showing parts for deriving signals of the example shown in FIG. 9.

DESCRIPTION OF THE PREFERRED EMBODIMENT

This invention will be hereinbelow described with reference to the drawings in which 3-phase CCDs are employed, by way of example, as solid state image sensors.

Figure 1:
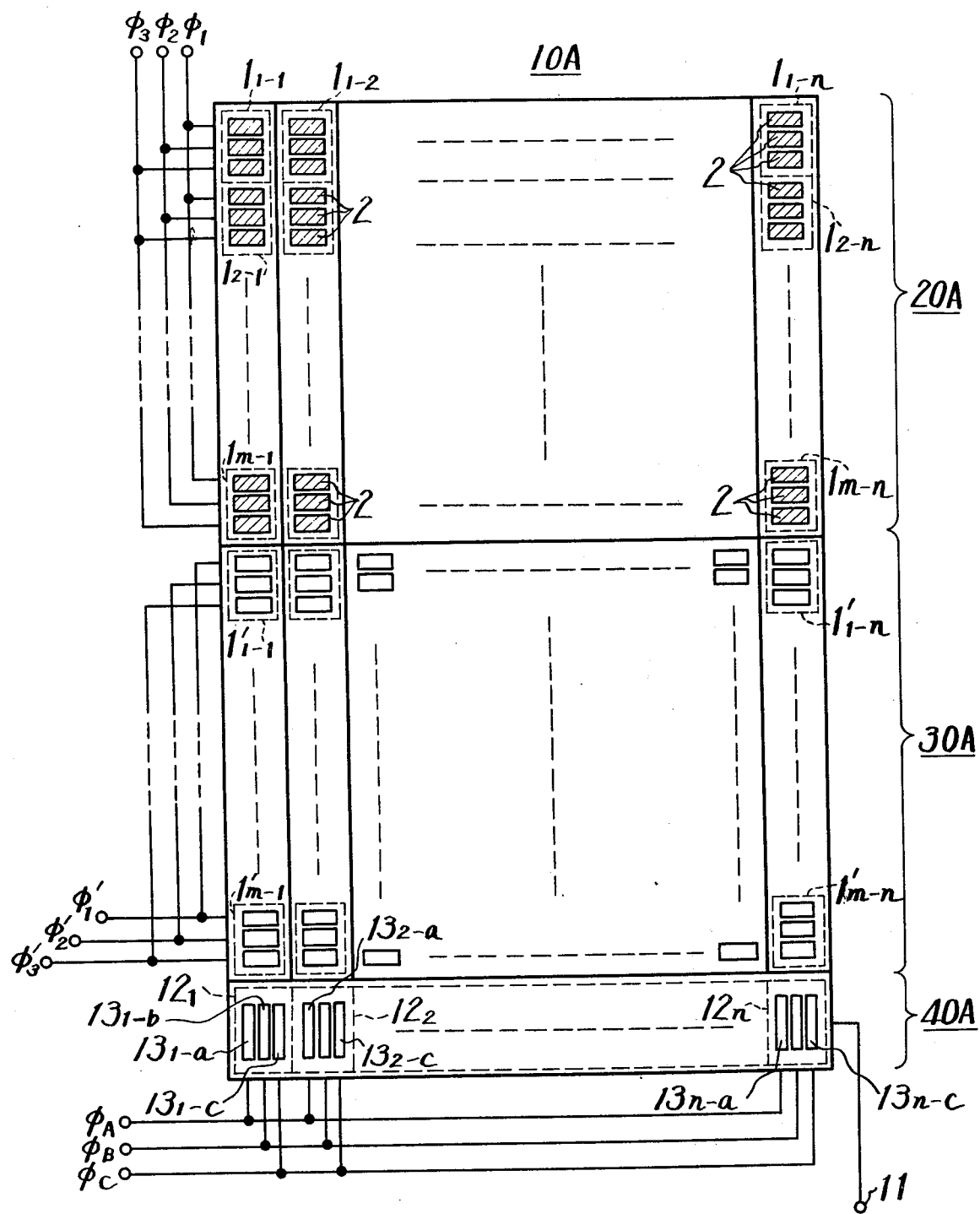
FIG. 1 is a view showing solid state image sensors of the invention.

In FIG. 1 a CCD 10A consists of a photo-sensitive array 20A on which an image of an object (not shown in FIG. 1) is projected, a temporary storage array 30A which may store electric charges corresponding to input photo information of the image from the photo sensitive array 20A, and a read-out register 40A for reading out an image signal. The photo-sensitive array 20A includes a predetermined number of picture elements $1_{1-1}$, $1_{1-2}$, ... $1_{m-n}$ which are arranged in the horizontal and vertical directions with a predetermined alignment pitch $\tau_H$, where $n$ and $m$ are positive integers. Each of the picture elements $1_{1-1}$, $1_{1-2}$, ... $1_{m-n}$ have three photo-sensing units 2 which are connected with three electrodes $\phi_1$, $\phi_2$ and $\phi_3$, respectively, to form the photo-sensitive array 20A of the 3-phase CCD.

Figure 2:
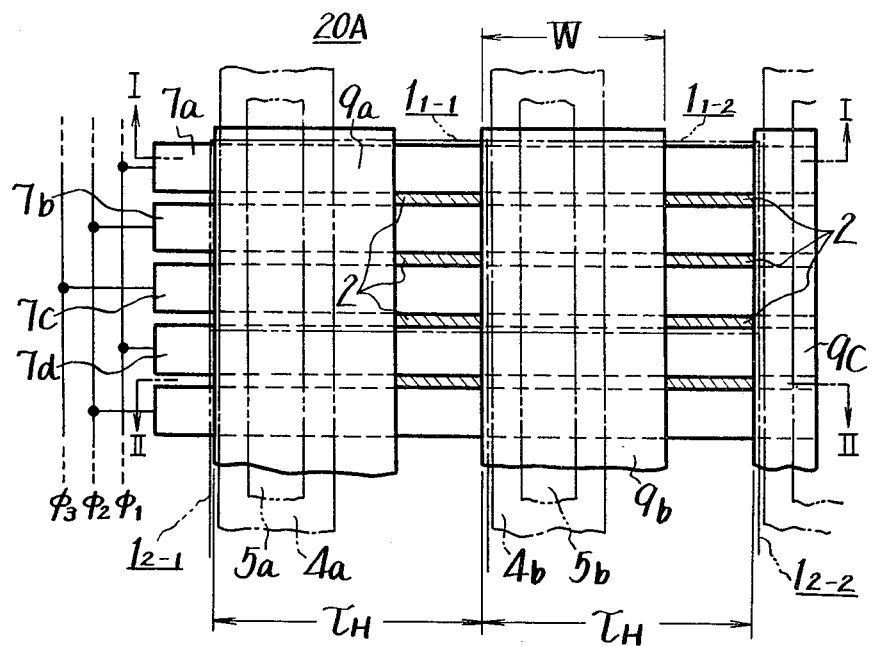
FIG. 2 is an enlarged view showing a part of the solid state image sensors shown in FIG. 1.
Figure 3A:
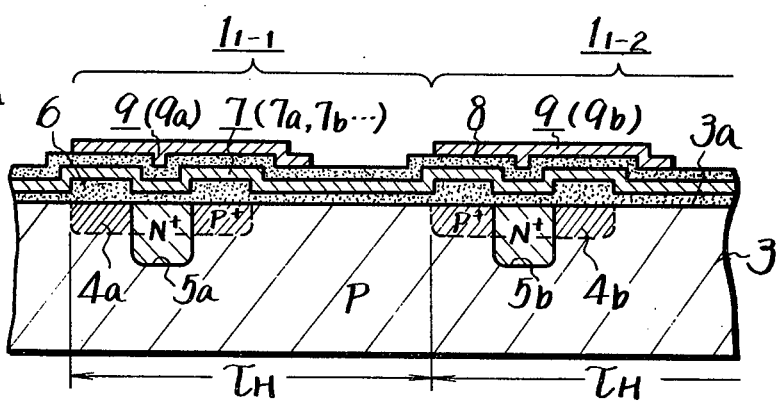
FIG. 3A is a cross-sectional view taken on the line I—I in FIG. 2.
Figure 3B:
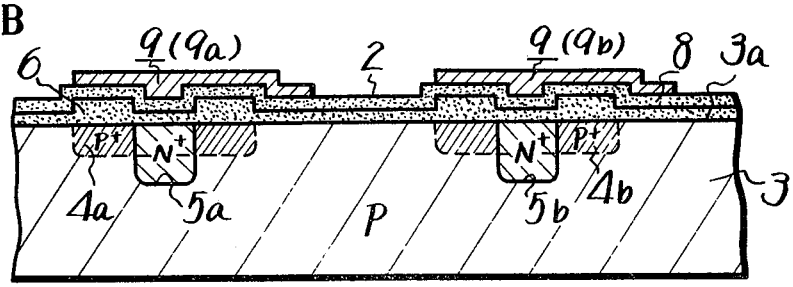
FIG. 3B is a cross-sectional view taken on the line II—II in FIG. 2.

FIG. 2, 3A and 3B shows a practical example of the photosensitive array 20A including the picture elements $1_{1-1}$, $1_{1-2}$, ... $1_{m-n}$.

In FIGS. 3A and 3B, a semiconductor substrate 3 is formed of, for example, a P-type conductivity. Regions 4a, 4b, ... are formed of the same conductivity type as that of the semiconductor substrate 3 but are different in impurity concentration with the alignment pitch $\tau_H$ as channel stops or stoppers. They are formed by the diffusion method from a major or top surface 3a of the semiconductor substrate 3. In the P-type regions 4a, 4b, ... there are formed by the diffusion method over-flow drain regions 5a, 5b, ... so as to discharge excess electrons which may be produced in the substrate 3 surrounded by the P-type regions 4a, 4b, ... The conductivity type of the regions 5a, 5b is different from that of the substrate 3, or an N-type in the illustrated example. In FIGS. 3A and 3B, an insulating layer 6 made of $SiO_2$ or the like is formed on the top surface 3a and is used in the diffusion method mentioned above.

A conduction layer 7 which is made of, for example, aluminum serves as an electrode on the insulating layer 6, that is, a first conduction layer 7a, which intersects the channel stop 4a at right angles and has a predetermined width on the horizontal plane, is formed on the insulating layer 6 and a second conduction layer 7b, whose width is same as that of the first conduction layer 7a, is also formed on the insulating layer 6 parallel to the first conduction layer 7a with a predetermined distance from the latter. Similarly, plural conduction layers 7c, 7d, ... are formed on the insulating layer 6 sequentially and repeatedly with respect to the vertical direction of the photo-sensitive array 20A. In this case the total number of the conduction layers 7 (7a, 7b, 7c, 7d, ...) is selected to be three times the number of picture elements which may be easily understood from the fact that the CCD 10A is 3-phase one. Then, the groups of every third conduction layer (7a, 7d ...), (7b, 7e, ...), ... are electrically connected, and the electrodes $\phi_1$, $\phi_2$ and $\phi_3$ are led from the connected conduction layer groups, respectively, as shown in FIG. 1.

A metal layer 9, which is made of, for example, aluminum serves as an opaque body, and is formed through an insulating layer 8 made of $SiO_2$ or the like on the conduction layer 7. In this case, the metal layer 9 consists of a plurality of band-shaped strips 9a, 9b, ... each having a predetermined width W, extending in the vertical direction for covering at least each of channel stops 4a, 4b, ... respectively, but not covering the channel stops belonging to the other channels, as shown in FIG. 2. Therefore, the cross hatched portions in FIG. 2 act as photo-sensing units 2 of the respective picture elements $1_{1-1}$, $1_{1-2}$, ... $1_{m-n}$. As shown in FIG. 3B, in the photo-sensing unit 2, there is no conduction layer 7 (7a, 7b, ...) blocking the top surface 3a of the semiconductor substrate 3.

With the photo-sensitive array 20A constructed as above, the input photo information of image of the object causes the induction of an electric charge in the semiconductor substrate 3 corresponding to the photo-sensing unit 2 which relates to any of the electrodes $\phi_1$, $\phi_2$ and $\phi_3$ which is supplied with an image-sensing bias having a predetermined potential relation to the input photo information. Thus, if a well-known transfer clock pulse is applied to the electrodes $\phi_1$ to $\phi_3$, the electrical charge induced in each of the picture elements $1_{1-1}$, $1_{1-2}$, ... $1_{1-n}$, $1_{2-1}$, ... $1_{2-n}$, ... $1_{m-l}$, ... $1_{m-n}$ in the horizontal scanning lines can be stored in the temporary storage array 30A during the vertical blanking time in its corresponding horizontal scanning positions. To this end, the temporary storage array 30A is formed substantially the same as the photo-sensitive array 20A in construction, but it is of course necessary that the whole temporary storage array 30A is shielded from light, so that the parts of the temporary storage array 30A corresponding to those of the photo-sensitive array 20A are marked with the same reference numerals with a prime "'" added.

The charges stored in the temporary storage array 30A are sequentially read out with clock or sampling pulse applied to the readout register 40A and then derived from a terminal II (FIG. 1) as the video signal $S_Y$. As shown in FIG. 1, the read-out register 40A comprises only read-out elements $12_1$, $12_2$, ... $12_n$ corresponding to the horizontal picture elements. In this case, the read-out is accomplished with sampling pulses $\phi_A$, $\phi_B$ and $\phi_C$ of 3-phases, so that the read-out elements $12_1$, $12_2$, ... $12_n$ have three read-out units $13_{1-a}$ $13_{1-c}$; $13_{2-a}$ $13_{2-c}$; ... respectively. From the CCD 10A formed as above, the video signal $S_Y$ is obtained which has signal components shown in FIG. 4. In FIG. 4, reference letter $S_{DC}$ indicates a DC component and $S_{SB}$ a side band component, respectively.

At least two CCDs 10A constructed as above are used. Needless to say, other types of solid state image sensors, such as a photo diode array instead of CCDs could be used.

FIG. 5 shows a color camera apparatus according to the invention. In FIG. 5, the light image of an object 14 is projected or cast through a lens 15, along light paths $l$, shown by dash lines to three CCDs 10A, 10B and 10C, respectively. Half mirrors 16a and 16b and mirrors 17a and 17b are located on the light path $l$. The images of the object 14 cast on the CCDs 10A to 10C are so selected that each image is shifted by $\tau H/3$ with respect to one of the others. As shown in FIG. 6, the relative positions of the CCDs 10A to 10C are so selected that when the CCD 10A is taken as a reference, the image of the object 14 cast on the CCD 10B is shifted just by $\tau H/3$ from that cast on the CCd 10A, and the image of the object 14 cast on the CCD 10C is shifted by $\tau H/3$ from that on the CCD 10B.

The images cast on the CCDs 10A to 10C are delivered to output terminals 11A to 11C of the CCDs 10A to 10C as electric signals $S_A$, $S_B$, and $S_C$ corresponding to the amounts of light supplied by the sampling pulses $\phi_A$ $\phi_C$. The electric signals are then applied through low pass filters 19a to 19c to an adder 21. The signals $S_A$, $S_B$ and $S_C$ derived from the CCDs 10A, 10B and 10C have a phase difference of $2\pi/N$ (N being the number of CCDs) or 120°to in this example and sequentially and alternately read. In order to sequentially and alternately read the three signals $S_A$ to $S_C$ at the phase difference of 120° with the sampling pulses $\phi_A$ to $\phi_C$, read-out registers 40A to 40C corresponding to the CCDs 10A to 10C are supplied with the sampling pulses $\phi_A$ to $\phi_C$, as shown in FIG. 7. The read-out elements $12_1$ to $12_n$ formed in each of the read-out registers 40A to 40C correspond to the picture elements aligned in the horizontal scanning direction, and each of the read-out elements $12_1$ to $12_n$ has three units. Therefore, in order to give the phase difference of 120°to to the same sampling pulses $\phi_A$ to $\phi_C$ between the read-out registers which pulses are supplied to the corresponding read-out units $13_{1-a}, 13_{2-a}, 13_{3-a}, \ldots$ of the read-out registers 40A to 40C, it is sufficient that the sampling pulses $\phi_A$ to $\phi_C$ are applied to the read-out units being shifted as shown in FIG. 7. Thus, when electric charges corresponding to one horizontal period are transferred from the three temporary storage arrays 30A to 30C to the corresponding read-out registers 40A to 40C, the electric charges are stored in the cross-hatched units by the sampling pulses $\phi_A$ without failure. Therefore, if the charges are read out from such a state, the phase relation upon reading out becomes 120°to and the read-out signals having the phase relation of 120°to can be obtained sequentially and alternately. And hence, the phase difference of 120°to is given between the composite signals $S_A$ to $S_C$.

When the sampling pulses $\phi_A$ to $\phi_C$ applied to the read-out registers 40A to 40C are obtained from three independent pulse generators (not shown), it is sufficient that the phase difference of 120°to is given therebetween. In such a case, there is no need to employ the connection shown in FIG. 7, but the connection similar to the case of using a single CCD is sufficient.

If the phase of a sampling carrier $W_1$ of an output signal from the CCD 10A in a resultant video signal $S_{YT}$ is taken as 0°to as shown in FIG. 8, similar sampling carriers $W_2$ and $W_3$ from the CCDs 10B and 10C have the phase difference of 120°to as shown in FIG. 8. In this case, the levels of the sampling carriers $W_1$ to $W_3$ are equal when the object 14 is of white and black color, so that if these sampling carriers $W_1$ to $W_3$ are composed, they become zero. That is, the sampling carriers and corresponding side band components are cancelled by applying them to the adder 21. Thus, DC components $S_{DCT}$ in the resultant video signal $S_{YT}$ can be substantially free from the influence of the sampling error.

As a result, side band components $S_{SB}$ mixed into high band components $S_{DH}$ in the DC components $S_{DC}$ shown in FIG. 4 can be neglected and hence no sampling error is produced. Accordingly, the frequency band of the DC components in the video signal $S_{YT}$ can be selected to be wider than the prior art. In the illustrated example the frequency band can be expanded to a band in which the second and higher harmonics in the side band components may be produced or practically to about $3/2 F_c$.

In the example shown in FIG. 5 optical color filters 22R, 22G and 22B which may transmit primary colors of red (R), green (G) and blue (B), respectively, are located in front of the CCDs 10A, 10B and 10C, respectively, to form the solid state color camera apparatus similar to a three tube type color camera apparatus. Thus, from the CCDs 10A to 10C, there are obtained ouput signals having color components corresponding to the red, green and blue colors. In this case when a black and white color object is picked up, the levels of the red, green and blue color components are substantially the same. Accordingly, the side band components are cancelled by a similar theory to that described in connection with FIG. 8 and no sampling error is created. When an object with color is picked up, since the levels of the red, green and blue color components are different, sampling errors are produced, however, in the case of a color screen, the quality of the picture is not significantly deteriorated.

The video signal from the adder 21 is applied to a band pass filter 23 whose center frequency is $f_c$. The output signal from the band pass filter 23 is applied to a detector 24A which has a detecting axis the same as that of the sampling carrier $W_1$ or that corresponding to the red color signal. The detector 24A then produces color signal components of $$(R - \frac{G+B}{2})$$

where R represents red; G, green and B, blue. The output signal from the band pass filter 23 is also applied to a detector 24B having a detecting axis advanced by $\pi/2$ from the sampling carrier $W_1$ which then produces a color signal of $(G - B)$. Therefore, if these color signals and the DC components $S_{DC}$ from the adder 21 are fed to the next stage matrix circuit 25, color signals of red (R), green (G) and blue (B) can be obtained. In FIG. 5 a delay circuit 26 is inserted into the signal path between the adder 21 and the matrix circuit 25 for compensating for the delay of the band pass filter 23.

Further, in the case of forming the color camera apparatus as described above, it may be possible that, without providing the color filters 22R to 22B, the half mirrors 16a and 16b are replaced by dichroic mirrors and the color selectivity is selected as described to achieve the same effects.

In the prior art, in order to obtain a desired resolution, it is necesary to increase the number of picture elements in the horizontal direction as mentioned previously which may pose a problem in the manufacture thereof. For example, if the transmission band of the DC components $S_{DC}$ is selected about 3.5 MHz, the sampling frequency $f_c$ must be selected in the order of 7.0 MHz to derive the signal without sampling error. As a result, more than 400 horizontal picture elements are required in the prior art. On the contrary, with the invention since the sampling error is completely eliminated, the sampling frequency $f_c$ can be selected about 4.0 MHz and hence about 250 of horizontal picture elements are sufficient.

Accordingly, the manufacturing of CCDs used in the invention is simplified. Further, although the number of the horizontal picture elements is about 250, three CCDs are used and an input photo information to one picture element is derived by three CCD 10A to 10C, so that the horizontal resolution can be improved without increasing the number of picture elements in the horizontal direction.

Therefore, if the resolution similar to that of the prior art in degree is obtained according to the invention, the number of picture elements in the horizontal direction can be further decreased with the result that the CCD is made compact and further simplified.

Further, if the color filters 22R, 22G and 22B are omitted, the camera apparatus of the invention can be used as a white and black camera.

It is sufficient that the number of the solid state sensors is more than two, that is, the invention is not restricted to the case of three solid state sensors as described above. When two CCDs are employed, the shift amount of the image of the object cast on the CCDs is $\tau H/2$, and the phase relation upon deriving the signals is selected to satisfy $180° (= 2 =12)$.

In the preferred embodiment of the invention, the CCDs are solid state sensors, but it may be easily understood that the invention can be applied to solid state sensors such as photo-diode arrays, bucket bridge devices (BBD) or the like.

FIG. 9 shows an embodiment in which a pair of solid state sensors 10A and 10B are employed to shift the image of the object 14 cast on the CCD by $\tau H/2$ in the horizontal and vertical directions so as to improve the vertical resolution without increasing the number of vertical picture elements. If the image of the object 14 is taken into consideration, one of the solid state sensors or the CCD 10A picks up image elements with circles O in a solid line block, while the other CCD 10B is shifted by $\tau H/2$ as shown by one-dot line block in the horizontal and vertical directions and picks up the image elements with crosses X which are shifted from those with O by $\tau H/2$ (with the phase difference $\pi$) in both the horizontal and vertical directions, respectively.

The output signals from the CCDs 10A and 10B are combined by a circuit shown in FIG. 10. In this case, if 2-phase ones may be used as the CCDs 10A and 10B, and the signals from the CCDs 10A and 10B may be combined by shifting the phase by $\pi$ with each other upon deriving the signals, a signal without sampling error could be obtained as described previously. However, since in the example of FIG. 10 the 3-phase CCDs are employed as in the case of the embodiment of FIG. 5, it is necessary that the signals be switched every horizontal scan and then combined. Since the signals are only switched at every horizontal scan, the phase relationship between the signals derived from the readout registers 40A and 40B becomes the same. Therefore, if one of the output signals from the CCDs 10A and 10B is not delayed by $\tau H/2$ or $\pi$, the signal which may have the relationship shown in FIG. 9 cannot be obtained.

FIG. 10 shows the embodiment which may satisfy the above signal treatment. In the embodiment of FIG. 10, the sampling signals $\phi_A$, $\phi_B$, $\phi_C$ obtained from a pulse generator 31 are alternately applied to the CCDs 10A and 10B at every horizontal scan through three switches $SW_1$, $SW_2$ and $SW_3$ which are ganged with one another and reversed at every one horizontal scan. A (delay circuit) 32 having a delay time of $\tau H/2$ is inserted into the output side of one of the CCDs 10A and 10B or 10B in the illustrated embodiment. The delayed output from the delay circuit 32, and the output from the CCD 10A, are applied to an adder 33. Since this adder 33 is alternately supplied with the signals obtained from the CCDs 10A and 10B at every one horizontal scan, in order to obtain a combined signal, the signal from the adder 33 must be added to one which is ahead thereof by one horizontal scan. To this end, the output signal from the adder 33 is applied to a delay circuit 34 whose delay time is one horizontal scan period, and the output signal from the delay circuit 34 and that from the adder 33 are supplied to an adder 35 which produces a combined signal and delivers the same to an output terminal 36.

With the invention constructed as above, the formation of the sampling error is prevented and the horizontal and vertical resolutions can be improved without increasing the number of the picture elements in the horizontal and vertical directions.

In the case where the image of the object 14, which is cast on the solid state sensors, is shifted by $\tau H/2$, there is no need to provide the delay circuit 34 and the adder 35.

In the above description, no consideration is given to the exposed area of the photo-sensing unit 2. However, since the exposed area of the photo-sensing unit 2 can be obtained as a coefficient for determining the response of the DC components $S_{DC}$, the CCDs 10A to 10C are practically formed in consideration of the exposed areas of the photo-sensing units 2 thereof.

According to the experiments carried out by the inventions of the invention, it is ascertained that if the exposed area of the photo-sensing unit 2 is selected in the order of ⅓ as compared with that of conductive layer 7 (in FIG. 2, the area of the unit 2 is not so selected), the dynamic range can be improved.

It may be apparent that many modifications and variations could be effected by one skilled in the art without departing from the spirit or scope of the novel concepts of the present invention.

What we claim is:

1. A solid state camera comprising:
   a plurality of image sensors, each having a plurality of picture-sensing units spaced apart by an alignment pitch of $\tau_H$,
   means for displaying an image simultaneously on each of said image sensors,
   means for displacing the image on each sensor by $\tau H/N$ in a given direction with respect to at least one other of said sensors where N equals the number of image sensors in said camera,
   means coupled to said picture sensing units for reading said respective images sequentially in said given direction,
   means for shifting the readout times thereof by a time equal to $2\pi/N°$ of the readout frequency, each of said reading means producing an output signal,
   means coupled to said reading means for mixing the respective output signals thereof, and
   means for deriving an output from said mixing means.

2. A solid state camera comprising:
   a plurality of image sensors each having a plurality of individual picture elements, spaced apart by an alignment pitch,
   means for displaying an image on each of said image sensors, each image being shifted with respect to the image on the other sensors by a distance proportional to the alignment pitch and by a distance inversely related to the number of sensors employed,
   a plurality of means for sequentially reading out electrical image information developed by said individual picture elements, and
   means for combining the signal output of each of said readout means.

3. A solid state camera (in accordance) with claim 1 wherein the image sensors comprise charge coupled devices having transfer electrodes and semiconductor substrates.

4. A solid state camera in accordance with claim 1 wherein said means for displaying an image simultaneously on each of said image sensors includes a different color filter for casting the image on each of the respective sensors.

5. A solid state camera in accordance with claim 4 wherein said means for mixing the respective output signals of the reading means includes means for developing a luminance signal and wherein said means for deriving an output from the mixing means comprises means for developing chrominance signals.

6. A solid state camera in accordance with claim 5 wherein said means for developing a luminance signal comprises a lowpass filter and said means for developing the chrominance signals is a highpass filter.

7. A solid state camera in accordance with claim 6 including means for developing color signals from said chrominance signals.

8. A solid state camera in accordance with claim 1 wherein said given direction corresponds to the vertical scanning direction of a video signal and wherein each image sensor has said picture sensing units aligned in the vertical direction.

9. A solid state camera in accordance with claim 3 wherein said reading means are shift registers and wherein said shift registers are operated by at least a pair of clock pulses.

10. A solid state camera in accordance with claim 1 wherein N equals three and wherein said reading means comprise shift registers and including means for developing three-phase clock pulses for operating the registers where the pulses differ from one another by 120° in phase.

11. A solid state camera in accordance with claim 10 wherein said shift registers are charge coupled devices operable by said three-phase clock pulses.

12. A solid state camera in accordance with claim 8 wherein a given position of an image displayed between any two of said image sensors are displaced with respect to one another by 1/N of the repetition rate of picture-sensing units in the vertical direction.

* * * * *